US007988120B2

(12) United States Patent
Hsu

(10) Patent No.: US 7,988,120 B2

(45) Date of Patent: Aug. 2, 2011

(54) FOLDABLE STAND FOR A MACHINE

(75) Inventor: Chih-Chin Hsu, Taichung (TW)

(73) Assignee: Rexon Industrial Corp., Ltd., Taichung (TW)

( * ) Notice: Subject to any disclaimer, the term of this patent is extended or adjusted under 35 U.S.C. 154(b) by 169 days.

(21) Appl. No.: 12/542,124

(22) Filed: Aug. 17, 2009

(65) Prior Publication Data

US 2010/0038500 A1 Feb. 18, 2010

(30) Foreign Application Priority Data

Aug. 18, 2008 (TW) ................................ 97131487 A

(51) Int. Cl.
*F16M 11/32* (2006.01)

(52) U.S. Cl. ........ 248/439; 248/166; 108/131; 108/132; 280/641; 280/645; 280/33.997

(58) Field of Classification Search .................. 248/166, 248/128, 129, 150, 436, 439; 108/131, 130, 108/132; 144/286.1; 280/641, 645, 33.997, 280/33.995, 33.996, 33.998

See application file for complete search history.

(56) References Cited

U.S. PATENT DOCUMENTS

| | | | | |
|---|---|---|---|---|
| 3,669,031 | A * | 6/1972 | Cole | 108/102 |
| 4,369,985 | A * | 1/1983 | Bourgraf et al. | 280/641 |
| 6,360,797 | B1 | 3/2002 | Brazell et al. | |
| 6,607,015 | B1 | 8/2003 | Chen | |
| 7,213,829 | B2 * | 5/2007 | Wu | 280/645 |
| 7,308,858 | B2 | 12/2007 | Lo et al. | |
| 7,464,956 | B2 * | 12/2008 | Chen et al. | 280/639 |
| 7,494,149 | B2 * | 2/2009 | Liu et al. | 280/639 |
| 7,681,892 | B1 * | 3/2010 | Crews et al. | 280/33.997 |

FOREIGN PATENT DOCUMENTS

TW M273664 8/2005

* cited by examiner

*Primary Examiner* — Anita M King

(74) *Attorney, Agent, or Firm* — Bacon & Thomas, PLLC

(57) ABSTRACT

A foldable stand for supporting a machine can be folded or extended between a collapsed position, an extended supporting position, and a hand carrying position. The foldable stand includes a platform formed by two bearing bars that define a bearing surface for supporting a machine. Two support units are pivotally connected to the bearing bars and can be pivoted, and selectively locked, between a collapsed position, an extended supporting position, and a hand carrying position. The selective locking is achieved by the selective engagement of positioning devices with locating grooves formed on the foldable stand.

20 Claims, 7 Drawing Sheets

FOLDABLE STAND FOR A MACHINE

FIELD OF THE INVENTION

The present invention relates to machine stands and more particularly, to a foldable stand for supporting a machine, which can be collapsed rapidly and which facilitates movement of the machine to different locations.

BACKGROUND

Taiwan Patent Publication Number M273664 discloses a foldable tool stand, which includes a table, a first leg and a second leg respectively pivotally connected to the table, and a locking mechanism. The locking mechanism comprises four first locating members set between the table and the legs, and right and left second locating members, wherein each first locating member has a rod-like shank, a stop portion extending from the periphery of the rod-like shank and a finger strip extending from the periphery of the rod-like shank. The rod-like shank of each first locating member is pivotally connected to the table by a pivot such that the user can manipulate the finger strip to rotate the rod-like shank of each of the first locating members, moving the stop portions to abut against the legs, thereby locking the legs in the extended position. Further, the right and left second locating members are respectively located on the table for securing the legs in the collapsed position.

While this design is functional, there is room for improvement. According to the aforesaid design, the first locating members are installed in the legs. In order to collapse the foldable tool stand, the user must manipulate the finger strip of each first locating member to rotate the rod-like shank of each first locating member counter-clockwise, thus disengaging the stop portions away from the legs for enabling the legs to be turned to the collapsed position. This procedure is complicated. Further, the left second locating member is a curved spring plate fixedly provided at the table. After a long period of use in abutment against the second leg, the left second locating member will deform, and will thus decrease the effectiveness thereof. Accordingly, at least an improvement on the design of the left second locating member is deemed necessary.

SUMMARY

The present disclosure has been accomplished under the circumstances in view. One feature of the present disclosure is to provide a foldable stand, which can be easily set in an extended supporting position for supporting a machine, a collapsed position, or a hand-carrying position for moving the machine to another location.

Thus, the foldable stand according to the present disclosure includes two bearing bars, two support units, a plurality of locating grooves, and two positioning devices. The bearing bars are arranged generally in parallel, and define a bearing surface for carrying a machine. The support units have the respective top sides thereof respectively pivotally connected to the distal ends of the bearing bars. The locating grooves are respectively located at the ends of the bearing bars. The positioning devices are respectively arranged in the support units and movable between two positions. When the positioning devices are moved to the first position, the support units are engaged in the locating grooves and locked to the bearing bars in the extended, collapsed or hand-carrying position. When the positioning devices are moved to the second position, the support units are movable relative to the bearing bars between the respective locating grooves.

Thus, the operation of the foldable stand of the present disclosure is simplified, thus facilitating working convenience. Further, because the second support unit can be used as a handlebar, the cost of an extra handlebar is eliminated.

DETAILED DESCRIPTION

Figure 1:
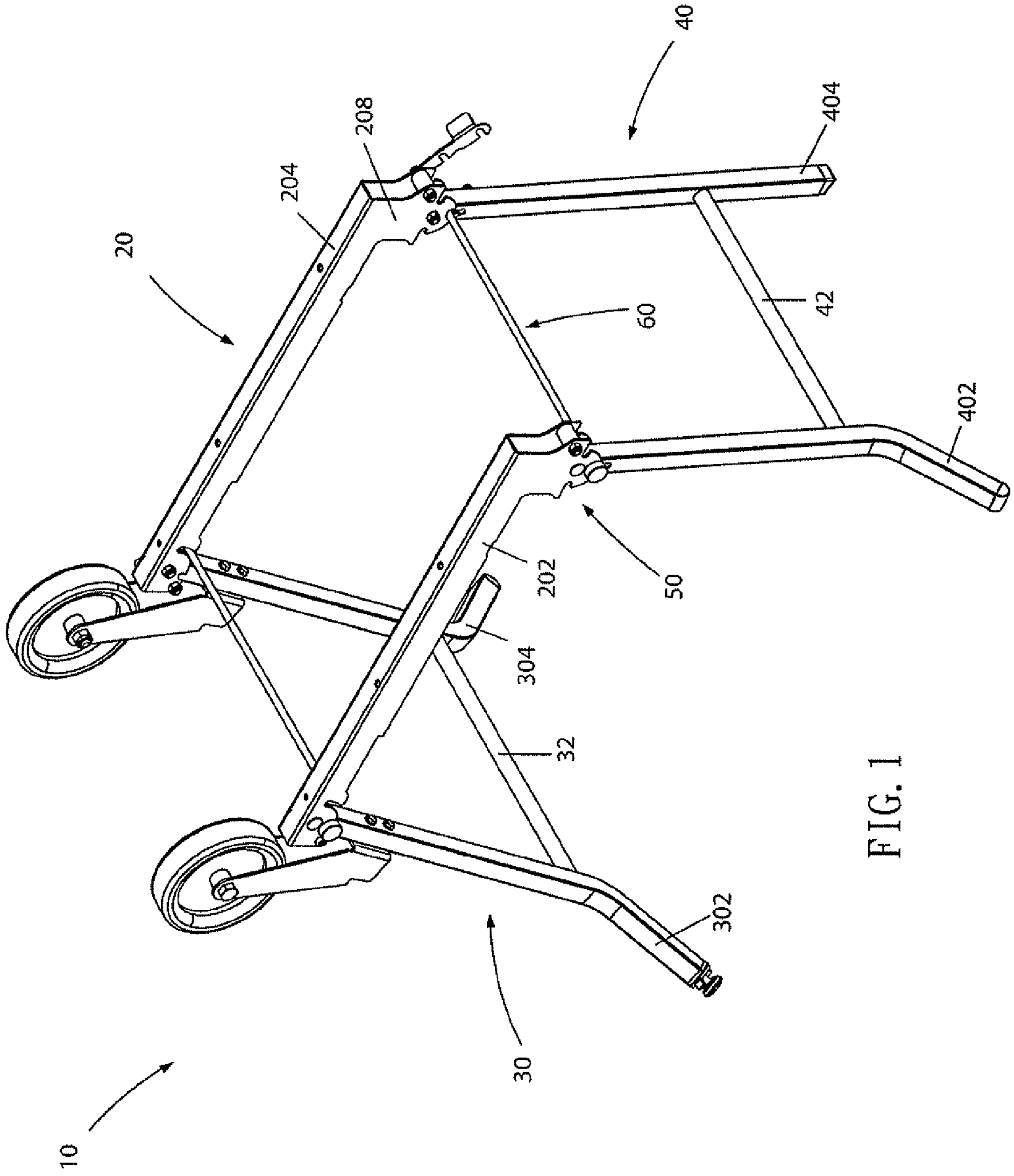
FIG. 1 is an elevational view, showing a foldable stand in an extended position according to the present disclosure.
Figure 2:
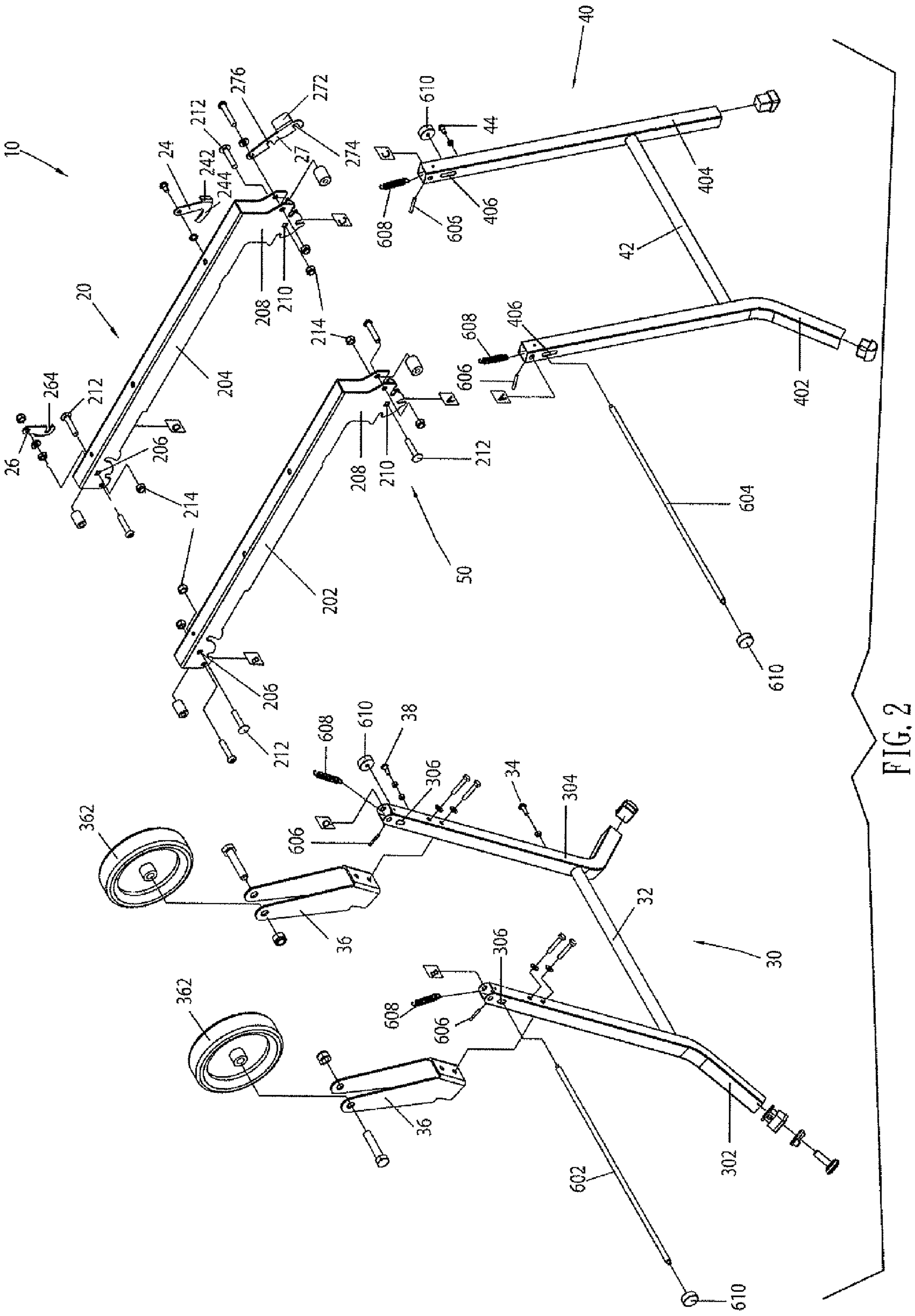
FIG. 2 is an exploded view of the foldable stand according to the present disclosure.
Figure 3:
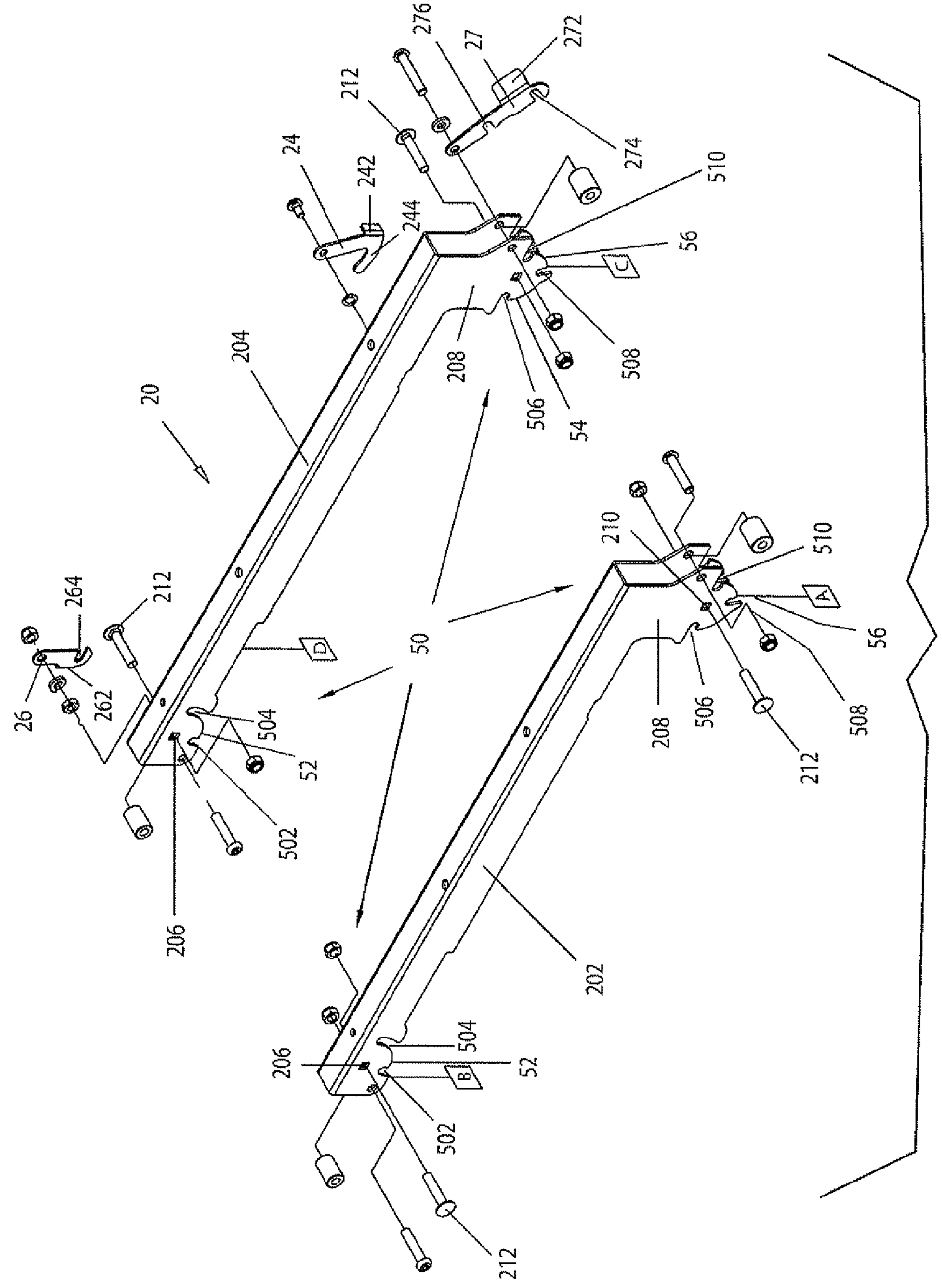
FIG. 3 is an enlarged view of a part of FIG. 2.

Referring to FIGS. 1-3, a foldable stand 10 is shown having a bearing unit 20, a first support unit 30, a second support unit 40, a set of locating grooves 50, and a positioning device set 60.

The bearing unit 20 defines a platform having a first lateral side and a second lateral side opposed thereto, and being formed by two rectangular members, i.e., a front bearing bar 202 and a rear bearing bar 204, that are spaced from each other at a predetermined distance and arranged generally in a parallel manner. The bearing unit 20 defines a bearing surface for supporting a machine (not shown), such as, for example, a table saw, miter saw, scroll saw, band saw, drilling machine, sander or the like. The front bearing bar 202 and the rear bearing bar 204 each have a first through hole 206 disposed at a first, left end, a lug 208 downwardly extended from a second, right end, and a second through hole 210 transversely defined through the lug 208. The rear bearing bar 204 has an angled hook member 24 pivotally connected thereto. The angled hook member 24 has one end terminating in a handle 242 and the other end terminating in a hook portion 244.

The first support unit 30 includes a front leg 302 and a rear leg 304 arranged generally in parallel, a stretcher 32 connected between the front leg 302 and the rear leg 304, and a first protruding device 34 formed of a screw and pivotally connected to the rear leg 302. Two wheel brackets 36 are respectively fixedly fastened to the front leg 302 and the rear leg 304 near a first, top end of the respective leg that is adjacent to the bearing surface of the bearing unit 20. Two wheels 362 are respectively pivotally mounted on the wheel brackets 36. Two oblong slots 306 are respectively transversely defined through the front leg 302 and the rear leg 304 near the top end of the respective leg.

The second support unit 40 includes a front leg 402 and a rear leg 404 arranged generally in parallel, a stretcher 42 connected between the front leg 402 and the rear leg 404, and two oblong slots 406 respectively transversely defined through the front leg 402 and the rear leg 404 near the first, top end of the respective leg. Each of the oblong slots 306, 406 has a smooth arcuate top side and a smooth arcuate bottom side.

Figure 4:
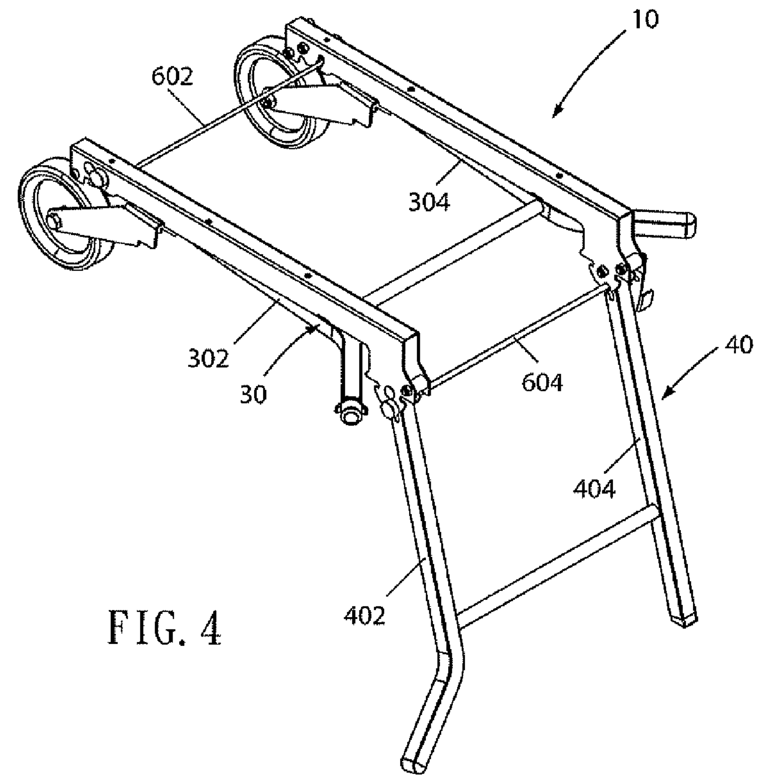
FIG. 4 is an elevational view of the foldable stand according to the present disclosure, showing the first support unit in the collapsed position.
Figure 5:
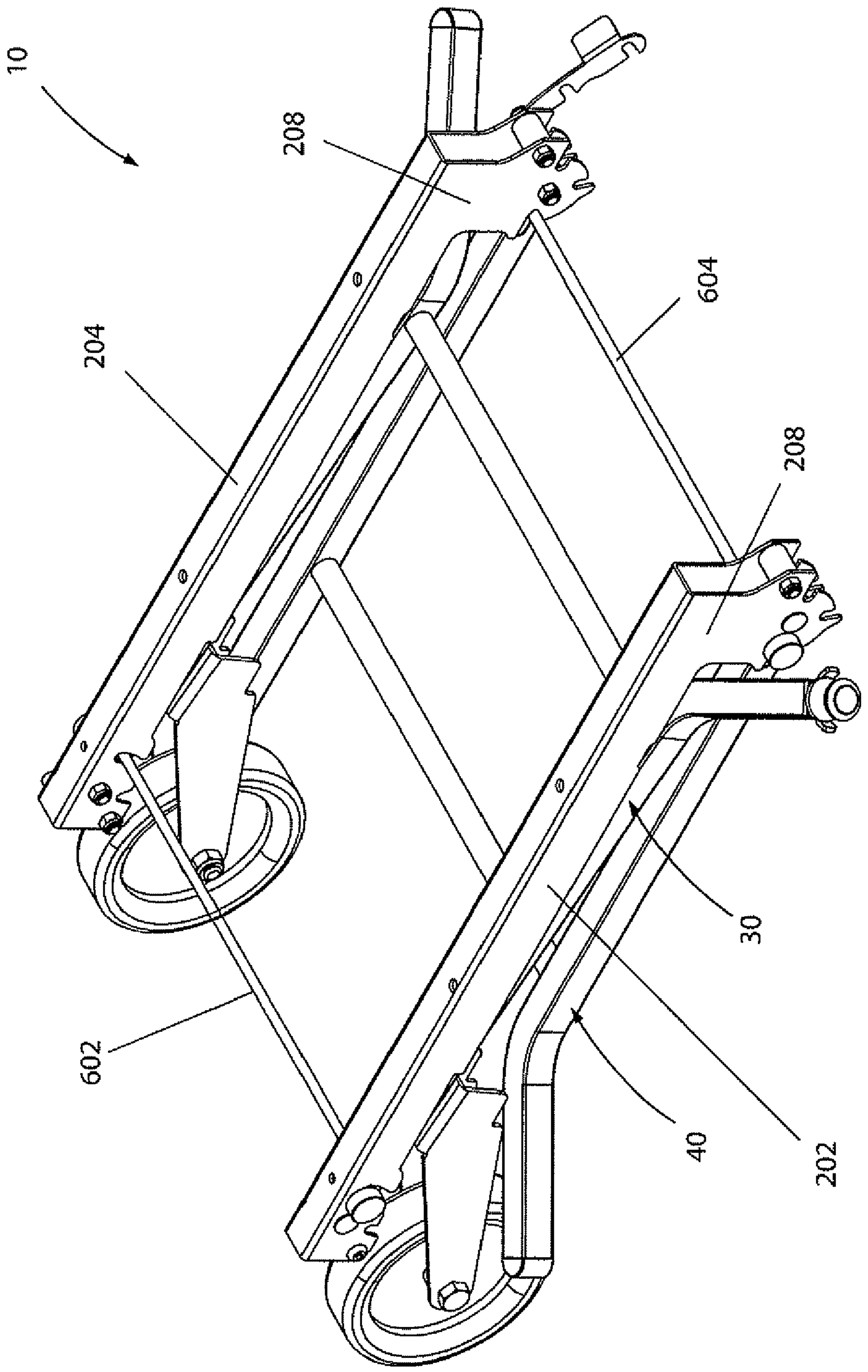
FIG. 5 is an elevational view of the foldable stand according to the present disclosure, showing the two support units in the collapsed position.
Figure 6:
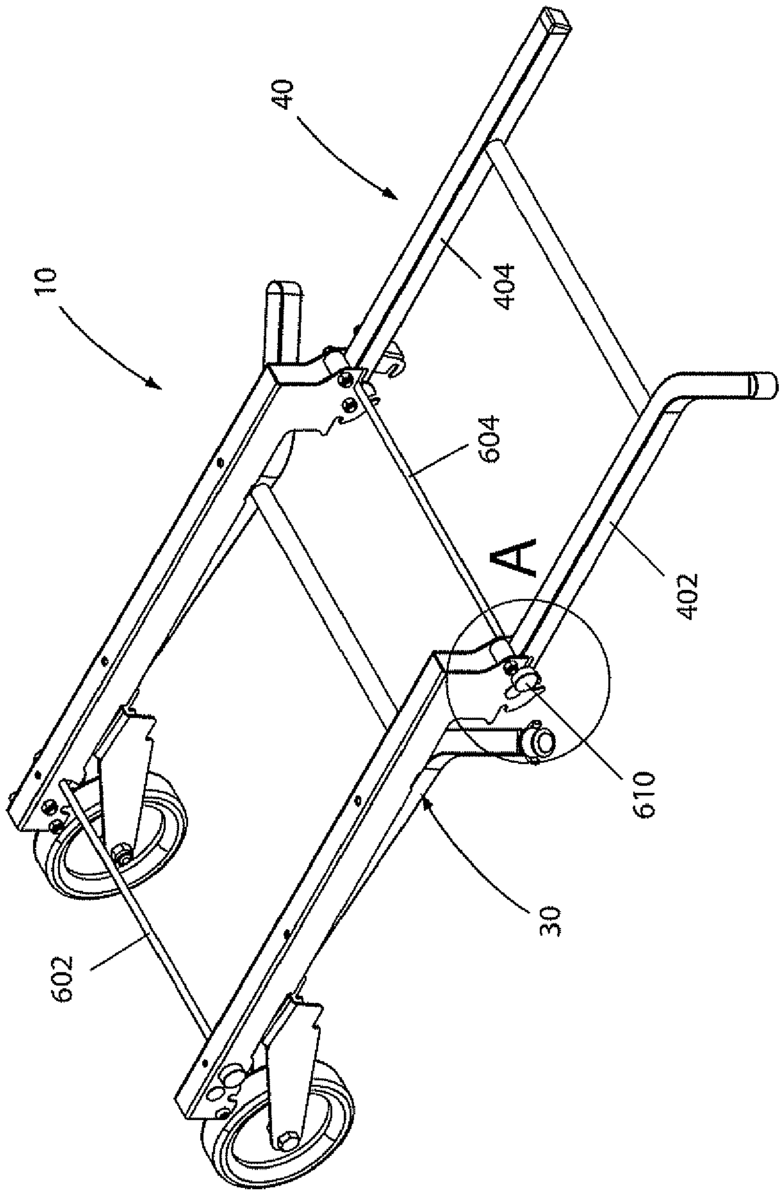
FIG. 6 is an elevational view of the foldable stand according to the present disclosure, showing the second support unit in the hand-carrying position.

Further, as shown in FIG. 2 and FIGS. 1, 4, 5 and 6, four screw bolts 212 are respectively inserted through the first through holes 206 and second through holes 210 and the top ends of the legs 302, 304, 402 and 404 to pivotally connect the legs 302 and 304 of the first support unit 30 to the first, left ends of the bearing bar 202 and 204 of the bearing unit 20 and the legs 402 and 404 of the second support unit 40 to the second, right ends of the bearing bar 202 and 204 of the bearing unit 20, enabling the first support unit 30 and the second support unit 40 to be respectively moved relative to the bearing unit 20 to an extended position (see FIG. 1), a collapsed position (see FIGS. 4 and 5), or a hand-carrying position (see FIG. 6).

As illustrated in FIG. 5, the lugs 208 extend downwards from the second, right ends of the bearing bars 202 and 204. The distance between the second through holes 210 and the bearing surface of the bearing unit 20 is relatively greater than the distance between the first through holes 206 and the bearing surface of the bearing unit 20. Thus, when the first support unit 30 and the second support unit 40 are moved to the collapsed position, the first support unit 30 is disposed at the top side of the second support unit 40 without interfering with the collapsing of the second support unit 40.

The locating grooves 50 (see FIG. 3) include two first locating grooves 502 respectively located on the bottom edges of the left ends of the front bearing bar 202 and rear bearing bar 204 of the bearing unit 20 right below the first through holes 206. Two second locating grooves 504 are respectively located on the bottom edges of the left ends of the front bearing bar 202 and rear bearing bar 204 of the bearing unit 20 at a right side relative to the first through holes 206. Two third locating grooves 506 are respectively located on the bottom edges of the lugs 208 of the front bearing bar 202 and rear bearing bar 204 of the bearing unit 20 at the left side relative to the second through holes 210. Two fourth locating grooves 508 are respectively located on the bottom edges of the lugs 208 of the front bearing bar 202 and rear bearing bar 204 of the bearing unit 20 below the second through holes 210. Two fifth locating grooves 510 are respectively located on the bottom edges of the lugs 208 of the front bearing bar 202 and rear bearing bar 204 of the bearing unit 20 at the right side relative to the second through holes 210. Each of the locating grooves 502, 504, 506, 508, and 510 are formed as smooth arcuate portions.

When the first support unit 30 is moved to the extended position, the two oblong slots 306 are respectively aligned with the two first locating grooves 502. When the first support unit 30 is moved to the collapsed position, the two oblong slots 306 are respectively aligned with the two second locating grooves 504. When the second support unit 40 is moved to the extended position, the two oblong slots 406 are respectively aligned with the two fourth locating grooves 508. When the second support unit 40 is moved to the collapsed position, the two oblong slots 406 are respectively aligned with the two third locating grooves 506. When the second support unit 40 is moved to the hand-carrying position, the two oblong slots 406 are respectively aligned with the two fifth locating grooves 510. The border edges of the bearing unit 20 between the first locating grooves 502 and the second locating grooves 504, the border edges of the bearing unit 20 between the third locating grooves 506 and the fourth locating grooves 508, and the border edges of the bearing unit 20 between the fourth locating grooves 508 and the fifth locating grooves 510 are arcuate, forming first smoothly arcuate edges 52, second smoothly arcuate edges 54 and third smoothly arcuate edges 56 respectively.

The positioning device set 60 comprises a first round rod 602 inserted through the two oblong slots 306 of the first support unit 30, a second round rod 604 inserted through the two oblong slots 406 of the second support unit 40, four pins 606, four tensile springs 608 and four knobs 610. The two distal ends of each of the first and second round rods 602 and 604 are threaded. After insertion of the round rods 602 and 604 through the oblong slots 306 and 406 of the support units 30 and 40, the knobs 610 are respectively threaded onto the threaded ends of the round rods 602 and 604 to prevent inadvertent removal of the round rods 602 and 604 from the oblong slots 306 and 406. The pins 606 are respectively fixedly mounted in the top ends of the legs 302, 304, 402 and 404 above the respective oblong slots 306 and 406. The tensile springs 608 have their respective top ends respectively connected to the pins 606 and their respective bottom ends respectively connected to the round rods 602 and 604.

Figure 7:
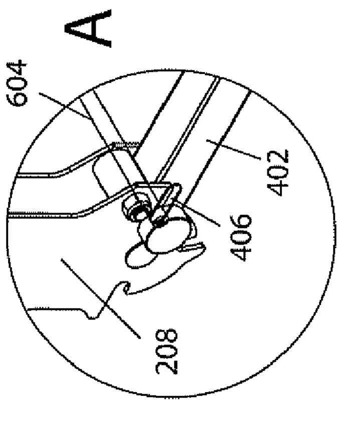
FIG. 7 is an enlarged view of a part of the foldable stand according to the present disclosure, showing the positioning device set in the first position.
Figure 8:
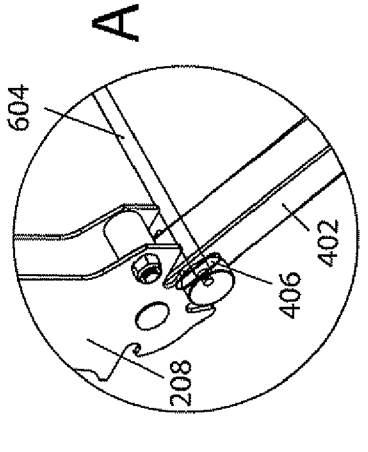
FIG. 8 is an enlarged view of a part of the foldable stand according to the present disclosure, showing the positioning device set in the second position.

As shown in FIGS. 7 and 8, the round rods 602 and 604 are normally held in the oblong slots 306 and 406 in a first position (see FIG. 7) when they receive no external force. A force can be applied to the round rods 602 and 604 to move the round rods 602 and 604 downwards along the oblong slots 306 and 406 to a second position (see FIG. 8). When the external force is released from the round rods 602 and 604, the tensile springs 608 pull the round rods 602 and 604 back to the first position.

Figure 9:
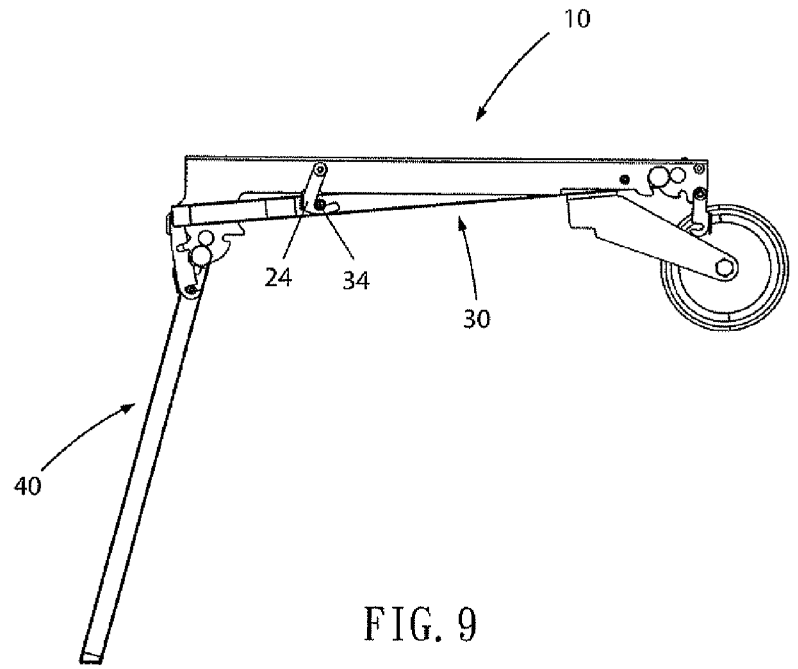
FIG. 9 is a schematic side view of the foldable stand according to the present disclosure, showing the first support unit in the collapsed position and the angled hook member hooked on the first support unit.

Referring to FIG. 9, when the user wishes to collapse the foldable stand 10, the first round rod 602 is moved downwards along the oblong slots 306 from the first position to the second position and then the first support unit 30 is pivoted to move the first round rod 602 out of the first locating grooves 502 and along the first smoothly arcuate edges 52 to the second locating grooves 504. After the first round rod 602 has been engaged into the second locating grooves 504, the handle 242 of the angled hook member 24 is moved to hook the hook portion 244 on the first protruding device 34 (see FIG. 9), thereby locking the first support unit 30 in the collapsed position (see FIG. 4). Thereafter, the second round rod 604 is moved downwards along the along the oblong slots 406 from the first position to the second position and then the second support unit 40 is pivoted to move the second round rod 604 out of the fourth locating grooves 508 and along the second smoothly arcuate edges 54 to the third locating grooves 506. After the second round rod 604 has been engaged into the third locating grooves 506, the second support unit 40 is locked in the collapsed position (see FIG. 5).

When the user wishes to extend out the foldable stand 10, the second round rod 604 is moved along the oblong slots 406 from the first position to the second position and then the second support unit 40 is pivoted to move the second round rod 604 out of the third locating grooves 506 and along the second smoothly arcuate edges 54 to the fourth locating grooves 508 to set the second support unit 40 in the extended position (see FIG. 4). Thereafter, the handle 242 of the angled hook member 24 is moved to disengage the hook portion 244 from the first protruding device 34 of the legs 304, and then the first round rod 602 is moved downwards along the oblong slots 306 from the first position to the second position and then the first support unit 30 is pivoted to move the first round rod 602 out of the second locating grooves 504 and along the first smoothly arcuate edges 52 to the first locating grooves 502, thereby locking the first support unit 30 in the extended position (see FIG. 1).

Figure 10:
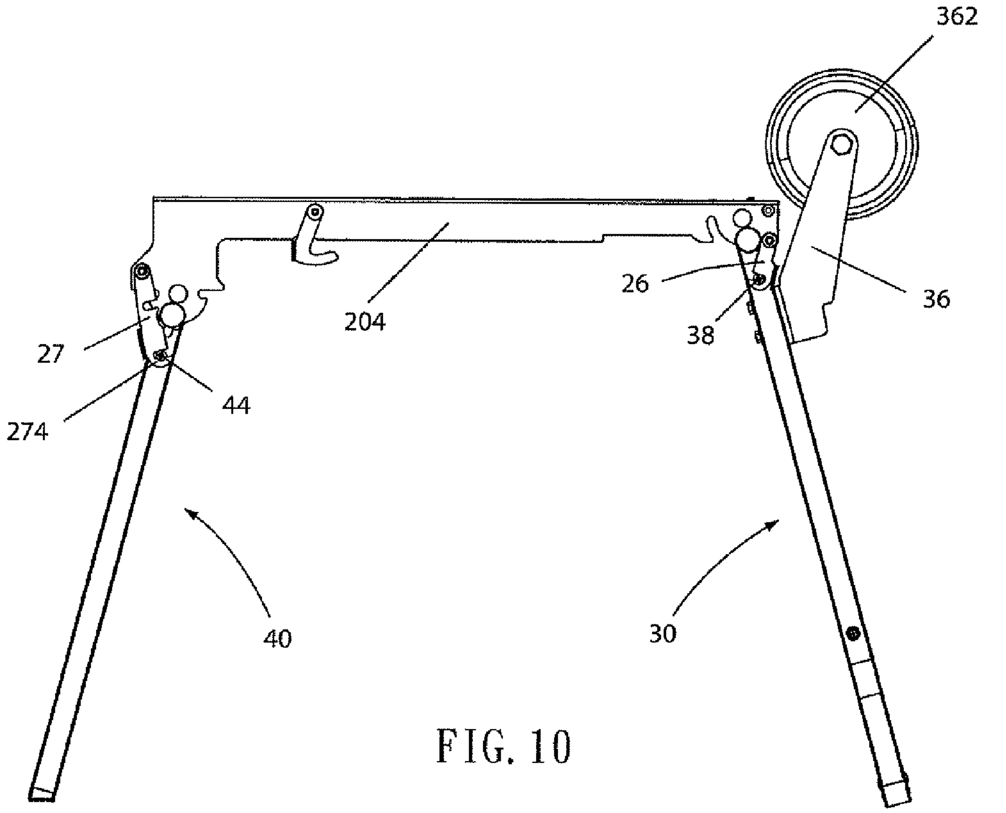
FIG. 10 is a schematic side view of the foldable stand according to the present disclosure, showing the first and second support units in the extended position and the locking bars respectively hooked on the first and second support units.

In order to enhance stability of the support units 30 and 40 in the extended position, as shown in FIG. 10, two locking bars 26 and 27 are provided at the bearing unit 20, and a second protruding device 38 and a third protruding device 44 are respectively provided at the support units 30 and 40. The arrangement of the locking bars 26 and 27 and the protruding devices 38 and 44 may be variously embodied. According to the present preferred embodiment, the locking bars 26 and 27 are respectively pivotally connected to the two ends of the rear bearing bar 204. One locking bar 26 has a handle 262 and a retaining notch 264. The other locking bar 27 has a handle 272 and two retaining notches 274 and 276.

The second protruding device 38 and the third protruding device 44 are respectively pivotally connected to the top ends of the rear legs 304 and 404. When the first support unit 30 is moved to the extended position, the handle 262 of the locking bar 26 is moved to force the retaining notch 264 into engagement with the second protruding device 38 at the rear leg 304, thus locking the first support unit 30 in the extended position. When the second support unit 40 is moved to the extended position, the handle 272 of the locking bar 27 is moved to force the retaining notch 274 into engagement with the third protruding device 44 at the rear leg 404, thus locking the second support unit 40 in the extended position. Similarly, the user can move the handles 262 and 272 of the locking bars 26 and 27 to disengage the retaining notches 264 and 274 from the second and third protruding device 38 and 44.

When the user wishes to use the foldable stand 10 to move the loaded machine to an alternate location, the first support unit 30 is set in the collapsed position (see FIG. 4), and then the second round rod 604 is moved downwards along the oblong slots 406 from the first position to the second position. Next, the second support unit 40 is pivoted to move the second round rod 604 out of the fourth locating grooves 508 and along the third smoothly arcuate edges 56 to the fifth locating grooves 510 to lock the second support unit 40 in the hand-carrying position (see FIG. 6).

Figure 11:
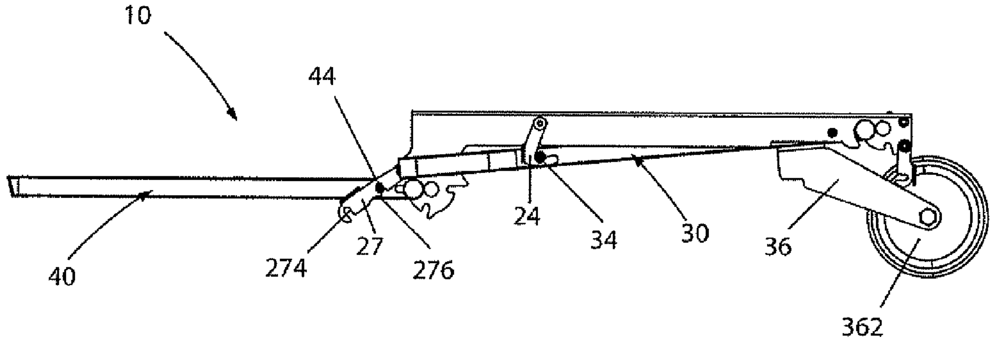
FIG. 11 is a schematic side view of the present invention, showing the second support unit in the hand-carrying position, the locking bar hooked on the second support unit.

To enhance the positioning, the handle 272 of the locking bar 27 is moved to force the retaining notch 276 of the locking bar 27 into engagement with the third protruding device 44 at the rear leg 404 (see FIG. 11). Thus, the user can use the second support unit 40 as the handlebar of the foldable stand 10 to move the wheels 362 of the first support unit 30 along the floor, thereby moving the loaded machine to the desired location.

By means of moving the positioning device set 60, the support units are shifted among the respective locating grooves to lock the foldable stand in the extended, collapsed or hand-carrying position. Thus, the operation of the foldable stand of the present invention is simplified for facilitating working convenience. Further, because the second support unit can be used as a handlebar, the cost of an extra handlebar is eliminated.

An exemplary embodiment of a foldable stand has been constructed with the features of FIGS. 1-11. The foldable stand functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A foldable stand, comprising:

a platform for supporting a machine, the platform having a first lateral side and a second lateral side opposed thereto, and a plurality of locating grooves respectively located on first and second ends of each of the first and second lateral sides;

first and second support units respectively pivotally connected to the first and second ends of the first and second lateral sides of the platform, each support unit having two oblong slots disposed adjacent to the platform; and first and second positioning devices respectively inserted through the oblong slots of the support units and movable within the oblong slots between a first position, where the positioning devices engage selected locating grooves to lock the support units with respect to the platform, and a second position, where the positioning devices are disengaged from the locating grooves for enabling the support units to be pivoted relative to the platform.

2. The foldable stand according to claim 1, wherein the positioning devices each comprise a rod member respectively inserted through the oblong slots, two pins respectively fixedly mounted in the support units above the oblong slots, and two spring members respectively connected between the rod member and the pins to bias the rod member towards the first position.

3. The foldable stand according to claim 2, wherein the platform has an arcuate edge respectively located on each of the first and second lateral sides and extending between adjacent locating grooves.

4. The foldable stand according to claim 1, wherein each oblong slot has an arcuate top side and an arcuate bottom side.

5. The foldable stand according to claim 1, wherein the locating grooves are smoothly arcuate and selectively aligned with the oblong slots.

6. The foldable stand according to claim 1, wherein the plurality of locating grooves comprises a plurality of first locating grooves and a plurality of second locating grooves; wherein when the positioning devices are engaged with the first locating grooves, the support units are collapsed against the platform; and wherein when the positioning devices are engaged with the second locating grooves, the support units are extended out to support the platform.

7. The foldable stand according to claim 6, wherein the plurality of locating grooves further comprises a plurality of third locating grooves; wherein when the positioning devices are engaged with the third locating grooves, the support units are set in a hand-carrying position.

8. The foldable stand according to claim 1, wherein the platform has at least one hook member pivotally connected thereto; and each support unit has at least one first protruding device wherein the at least one hook member can be selectively engaged with the at least one first protruding device.

9. The foldable stand according to claim 1, wherein the platform has a plurality of locking bars pivotally connected thereto; and each support unit has at least one second protruding device for the selective engagement of the locking bars therewith.

10. The foldable stand according to claim 1, wherein one support unit comprises two brackets, and two wheels respectively pivotally mounted to the brackets.

11. The foldable stand according to claim 1, wherein the platform is formed by a front bearing bar and a rear bearing bar spaced from each other at a predetermined distance and arranged generally in a parallel manner to define a bearing surface.

12. The foldable stand according to claim 11, wherein the front and rear bearing bars are rectangular members.

13. The foldable stand according to claim 11, wherein the front and rear bearing bars further comprise downwardly extending lugs from a respective end thereof.

14. The foldable stand according to claim 13, wherein the plurality of locating grooves comprises a plurality of first locating grooves and a plurality of second locating grooves defined in the downwardly extending lugs; wherein when the positioning devices are engaged with the first locating grooves, the support units are collapsed against the platform; and wherein when the positioning devices are engaged with the second locating grooves, the support units are extended out to support the platform.

15. The foldable stand according to claim 14, wherein the plurality of locating grooves further comprises a plurality of third locating grooves defined in the downwardly extending lugs; wherein when the positioning devices are engaged with the third locating grooves, the support units are set in a hand-carrying position.

16. The foldable stand according to claim 1, wherein the first and second support units each comprise a front leg and a rear leg arranged generally in parallel.

17. The foldable stand according to claim 16, wherein the first and second support units each further comprise a stretcher connected between the respective front and rear legs.

18. The foldable stand according to claim 16, wherein the oblong slots are formed near a top end of each of the front and rear legs of each of the first and second support units.

19. A foldable stand, comprising:

a platform formed by a front bearing bar and a rear bearing bar spaced from each other at a predetermined distance and arranged generally in a parallel manner to define a bearing surface for supporting a machine, and a plurality of locating grooves respectively located on first and second ends of each of the front and rear bearing bars;

first and second support units respectively pivotally connected to the first and second ends of the front and rear bearing bars, each support unit having two oblong slots disposed adjacent to the platform; and first and second positioning devices respectively inserted through the oblong slots of the support units and movable within the oblong slots between a first position, where the positioning devices engage selected locating grooves to lock the support units with respect to the platform, and a second position, where the positioning devices are disengaged from the locating grooves for enabling the support units to be pivoted relative to the platform.

20. A foldable stand, comprising:

a platform for supporting a machine, the platform having a first lateral side and a second lateral side opposed thereto, and a plurality of locating grooves respectively located on first and second ends of each of the first and second lateral sides;

first and second support units respectively pivotally connected to the first and second ends of the first and second lateral sides of the platform, each support unit having a front leg and a rear leg arranged generally in parallel and oblong slots are formed near a top end of each of the front and rear legs of each of the first and second support units adjacent to the platform; and first and second positioning devices respectively inserted through the oblong slots of the support units and movable within the oblong slots between a first position, where the positioning devices engage selected locating grooves to lock the support units with respect to the platform, and a second position, where the positioning devices are disengaged from the locating grooves for enabling the support units to be pivoted relative to the platform.

* * * * *